United States Patent [19]

Ho et al.

[11] Patent Number: 6,072,770
[45] Date of Patent: Jun. 6, 2000

[54] METHOD AND SYSTEM PROVIDING UNIFIED DPSK-PSK SIGNALLING FOR CDMA-BASED SATELLITE COMMUNICATIONS

[75] Inventors: Jin-Meng Ho, Lake Hiawatha; Ramautar Sharma, Berkeley Heights, both of N.J.

[73] Assignee: AT&T Corporation, New York, N.Y.

[21] Appl. No.: 08/808,777

[22] Filed: Mar. 4, 1997

[51] Int. Cl.[7] .................................................. H04L 12/16
[52] U.S. Cl. .......................... 370/209; 370/320; 375/200; 375/206
[58] Field of Search .................................... 370/315, 320, 370/323, 316, 209, 208, 204, 335, 342, 441; 375/200, 206, 208

[56] References Cited

U.S. PATENT DOCUMENTS

| 5,023,889 | 6/1991 | Divsalar et al. . |
| 5,465,269 | 11/1995 | Schaffner et al. ....................... 375/200 |
| 5,515,396 | 5/1996 | Dalekotzin ............................... 375/206 |
| 5,793,794 | 8/1998 | Kato et al. ............................... 375/200 |
| 5,815,527 | 9/1998 | Erving et al. ............................ 375/206 |
| 5,903,593 | 5/1999 | Ishiguro et al. ......................... 375/200 |

FOREIGN PATENT DOCUMENTS 0 430 587 A2  6/1991  European Pat. Off. .

WO 96/31960  10/1996  WIPO .

*Primary Examiner*—Alpus H. Hsu
*Assistant Examiner*—Daniel Prévil
*Attorney, Agent, or Firm*—Banner & Witcoff, Ltd.

[57] ABSTRACT

A method and a system for multi-user communications in a CDMA-based satellite network. An uplink RF signal containing a coded user message that has been differentially phase encoded and spread using a Walsh function and a pseudo-random number (PN) sequence for the uplink, is received by a satellite receiver. The received uplink RF signal is non-coherently quadrature demodulated and then despread using the uplink PN sequence and Walsh function. The differential phase signal carrying the coded user message is regenerated onboard the satellite by phase comparison and switched to a selected downlink transmitter. The quadrature components of the differential phase signal are then respread using a Walsh function and a PN sequence for the downlink, followed by quadrature modulation for transmission to a terrestrial receiver. The received downlink RF signal is coherently quadrature demodulated and despread using the PN sequence and Walsh function for the downlink. The downlink carrier phase originated from the uplink differential phase is regenerated from the despread quadrature baseband components and, hence, the coded user message is detected and decoded.

32 Claims, 2 Drawing Sheets

METHOD AND SYSTEM PROVIDING UNIFIED DPSK-PSK SIGNALLING FOR CDMA-BASED SATELLITE COMMUNICATIONS

CROSS-REFERENCE TO RELATED APPLICATIONS

The present invention is related to U.S. patent application Ser. No. 08/808/782 entitled "Method for Multitone Division Multiple Access Communications", filed Mar. 4, 1997; U.S. patent application Ser. No. 08/808/776 entitled "Differential PSK Signalling In CDMA Networks", filed Mar. 4, 1997, and U.S. patent application Ser. No. 08/810/557 entitled "An FFT-Based Multitone DPSK Modem", filed Mar. 4, 1997, each commonly assigned and each of which are incorporated by reference herein.

BACKGROUND OF THE INVENTION

1. Field of the Invention

The present invention relates to the field of telecommunications. More particularly, the present invention relates to a method and a system for CDMA-based satellite communications.

2. Description of the Related Art

Code Division Multiple Access (CDMA) is a more effective multiple access platform for terrestrial wireless networks than Time Division Multiple Access (TDMA) or Frequency Division Multiple Access (FDMA) primarily because CDMA provides a greater frequency reuse efficiency by reusing the same frequency bands in geographically closer cells. The greater frequency reuse efficiency provided by CDMA is also an advantage for satellite communications. Nevertheless, while most conventional satellite networks are based on either FDMA or TDMA, newly proposed CDMA satellite networks are largely of bent-pipe nature, in that no baseband processing or switching occurs onboard a satellite.

System performance can be improved in terms of quality and capacity by onboard satellite processing and switching. However, unlike TDMA or FDMA approaches, a conventional CDMA approach used aboard a regenerative satellite requires that the different user signals be separated for onboard processing and switching. Coherent uplink demodulation may be used for onboard baseband processing and switching, but coherent demodulation necessitates a complex hardware implementation, i.e., carrier phase tracking is needed for each individual user signal, which is constrained on a satellite by limited available power.

What is needed is a way for providing CDMA communications in a satellite network without requiring coherent demodulation in uplink reception so that onboard satellite processing and switching can be conveniently performed.

SUMMARY OF THE INVENTION

The present invention provides CDMA transmission of multipoint-to-multipoint signals through a satellite without requiring coherent demodulation for an uplink receiver on a satellite, while permitting baseband processing, full or marginal, and switching onboard the satellite.

The advantages of the present invention are provided by a method and a system that groups (coded) user message bits into successive groups at a terrestrially-based transmitter, then generates a differential phase for each message bit group by mapping each message bit group on to a predetermined PSK constellation. An absolute phase is generated for each message bit group by adding the differential phase for each message bit group to the absolute phase for the preceding message bit group. The absolute phase signal is phase keyed to an uplink RF carrier forming an uplink RF signal. The RF signal is spread using an uplink user Walsh function and an uplink beam code sequence, and transmitted to a satellite that is part of a satellite communications network.

The RF signal is received at the satellite and non-coherently quadrature demodulated generating quadrature baseband signals. Then, the quadrature baseband signals are despread using the uplink beam code sequence and the uplink user Walsh function. Successive blocks of the despread baseband signals are phase compared for extracting the differential phase signals carrying the (coded) user message. Next, the differential phase signal is switched to a transmitter associated with an appropriate downlink destination path. Two quadrature phase signals are generated from the switched differential phase signal and spread using a downlink user Walsh function and a downlink beam code sequence, followed by lowpass filtering for shaping the baseband spectrum. At this stage, the spread quadrature baseband components are impressed on downlink quadrature carrier components and transmitted to a ground terminal to which the user message is intended. The RF signal is received at the terrestrially-based receiver, and coherently quadrature demodulated into quadrature phase components. The quadrature phase components are despread using the downlink beam code sequence and the downlink user Walsh function for extracting the downlink phase signal. The extracted phase signal is the uplink differential phase signal corrupted by noise and interference in both the uplink and downlink. The extracted phase signal is used for recovering the user message.

BRIEF DESCRIPTION OF THE DRAWING

The present invention is illustrated by way of example and not limitation in the accompanying figures in which like reference numerals indicate similar elements and in which.

DETAILED DESCRIPTION

The present invention is directed primarily to CDMA satellite communication systems and to transmission of CDMA signals from a ground transmitting station, through a satellite and back to a ground receiving station without the need for coherent demodulation of the uplink signals at the satellite. The present invention facilitates onboard satellite processing and switching by providing a simple mechanism for demodulating and separating individual signals transmitted on an uplink through the same CDMA carrier. CDMA communication links are effectively improved because noise and interference corrupting uplink signals are not amplified at the satellite, but are suppressed on the satellite. Channel decoding and recoding on the satellite may be performed for further reducing the uplink BER (Bit Error Rate). Differential phases of uplink signals are regenerated by a satellite receiver, switched, and sent to the appropriate ground station receiver. Detection of downlink transmissions at the ground station is by coherent PSK techniques because a ground station receiver can conveniently include the components for tracking the carrier phase of a received signal based on the phase singularity of the received downlink signal. In short, uplink signalling, onboard satellite processing, and downlink signalling are each optimized by the present invention.

The present invention provides that a differential PSK technique for CDMA networks is applied to the uplink. An absolute carrier phase for a current (coded) information symbol is determined from the sum of the differential phase corresponding to the current symbol and the absolute phase of the preceding symbol. A conventional PSK signal is then generated by the absolute phase signal and spread by a Walsh function identifying the sender in the uplink. Subsequently, the signal is spread by a pseudo-random number (PN) sequence identifying a particular satellite beam covering the sender in the uplink. The signal is then power amplified for uplink transmission. Uplink reception at a satellite essentially reverses these steps for extracting and regenerating a user signal, which is carried in a differential phase form, without channel decoding. No carrier phase estimation is required at the satellite for each individual sender, and frequency down-conversion to baseband signal components can be done collectively for all the user signals sharing the same CDMA carrier. A regenerated differential phase symbol is switched to an appropriate beam transmitter, as indicated by the system, for downlink transmission to an intended destination. Phase tracking is easily achieved at a ground receiver, so the downlink transmission is completed by coherent PSK demodulation at the ground receiver. Channel decoding is then applied for recovering the sender message bits originated from an uplink.

Figure 1:
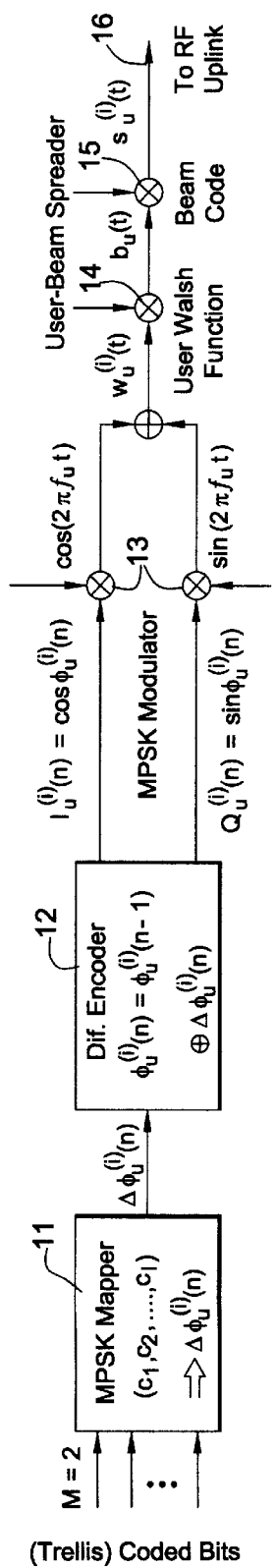
FIG. 1 is a block diagram showing the basic functional elements of a ground-to-satellite uplink transmitter according to the present invention.

FIG. 1 is a block diagram showing the basic functional elements of a ground-to-satellite uplink transmitter using differential PSK signalling in a Direct Sequence Code Division Multiple Access (DS-CDMA) network according to the present invention. Alternatively, the transmitter of FIG. 1 (and the rest of the system shown in FIGS. 2–4) can be part of a terrestrial wireless network, such as a cellular network or a PCS network. In FIG. 1, information bits forming a user message are encoded, such as by trellis encoding, before PSK mapping at a ground-based transmitter. A bit/symbol interleaver may be employed in a well-known manner either before or after symbol mapping for hard- or soft-decoding. The coded information bits are mapped by MPSK mapper 11 into signal points in a predetermined PSK constellation in a well-known manner. The phase resulting from each group of coded information bits (i.e., from each coded symbol) is treated as a differential phase $\Delta\phi_u^{(i)}(n)$. An absolute phase $\phi_u^{(i)}(n)$ for the group n of coded information bits is derived by adding the differential phase $\Delta\phi_u^{(i)}(n)$ for the group n in a well-known manner to the absolute phase value $\phi_u^{(i)}(n-1)$ for the preceding group n−1 by a differential phase encoder 12. In-phase and quadrature components of the absolute phase signal are then generated.

The in-phase and quadrature components of the absolute phase signal $\phi_u^{(i)}(n)$ are impressed on the quadrature components of an RF carrier having a desired carrier frequency for the uplink by using a standard PSK modulator 13. After PSK modulation, the RF signal is spread in a well-known manner at 14 using a Walsh function $W_u^{(i)}(t)$ assigned to the user for the uplink by the system at call setup. A PN sequence $b_u(t)$ associated with, for example, a satellite beam for the uplink, is used for further spreading the modulated signal at 15 in a well-known manner for generating a spread signal $s_u^{(i)}(t)$ before RF transmission at 16. RF amplification may be applied for generating a desired transmitted power prior to feeding the signal to a transmit antenna.

Figure 2:
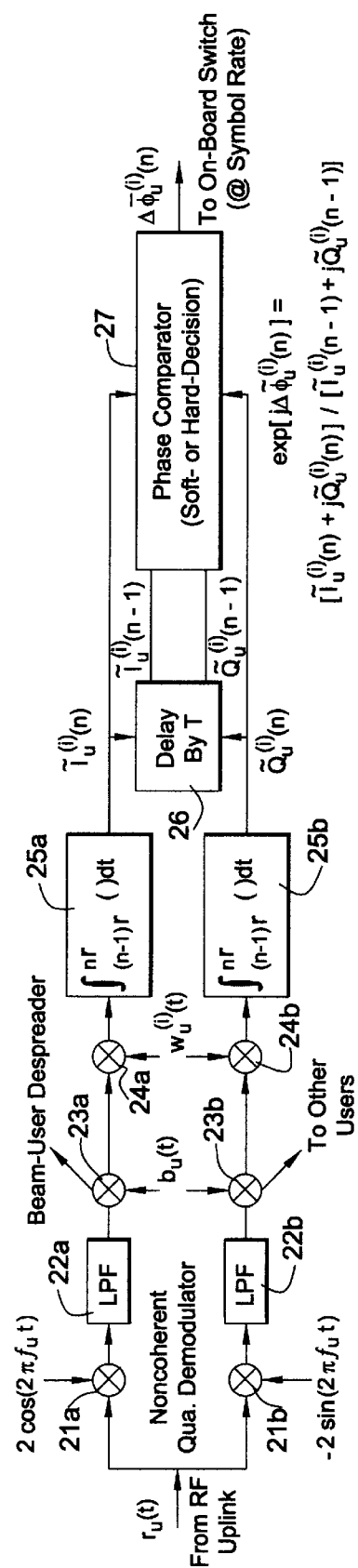
FIG. 2 is a block diagram showing the basic functional elements of a ground-to-satellite uplink receiver according to the present invention.

FIG. 2 is a block diagram showing the basic functional elements of an uplink receiver using differential PSK signalling in a DS-CDMA network according to the present invention. At the uplink receiver onboard, for example, a satellite received RF signal $r_u(t)$ is non-coherently quadrature down-converted to a quadrature baseband signal, and then despread by the PN sequence and the Walsh function used at the transmitter for spreading; a desired user message signal is thus extracted from other user signals sharing the same CDMA channel. A phase comparator is used for calculating the phase difference between two consecutive despreader outputs for onboard switching. The phase difference calculated between the two consecutive despreader outputs carries the user message.

In FIG. 2, after appropriate RF filtering and amplification, a received RF signal is down-converted to a baseband signal by non-coherent quadrature demodulation at 21a and 21b, and lowpass filtering at 22a and 22b. A message signal intended for a particular user is extracted from the demodulated in-phase and quadrature components by first despreading in a well-known manner using the beam code sequence $b_u(t)$ for the user at 23a and 23b, and then despreading using the user Walsh function $w_u^i(t)$ at 24a and 24b and an integrate-and-dump process at 25a and 25b. For uplink reception, the down-conversion and beam code despreading may be done collectively for all received user signals associated with the same CDMA carrier and the same beam. The quadrature outputs from integrator 25a and 25b are then differentially phase compared in a well-known manner at 27 using a delay of symbol period T at 26 for yielding a differential phase signal carrying the desired message information. The resulting differential phase signal is then switched in a well-known manner onboard the satellite for transmission to an appropriate downlink.

Figure 3:
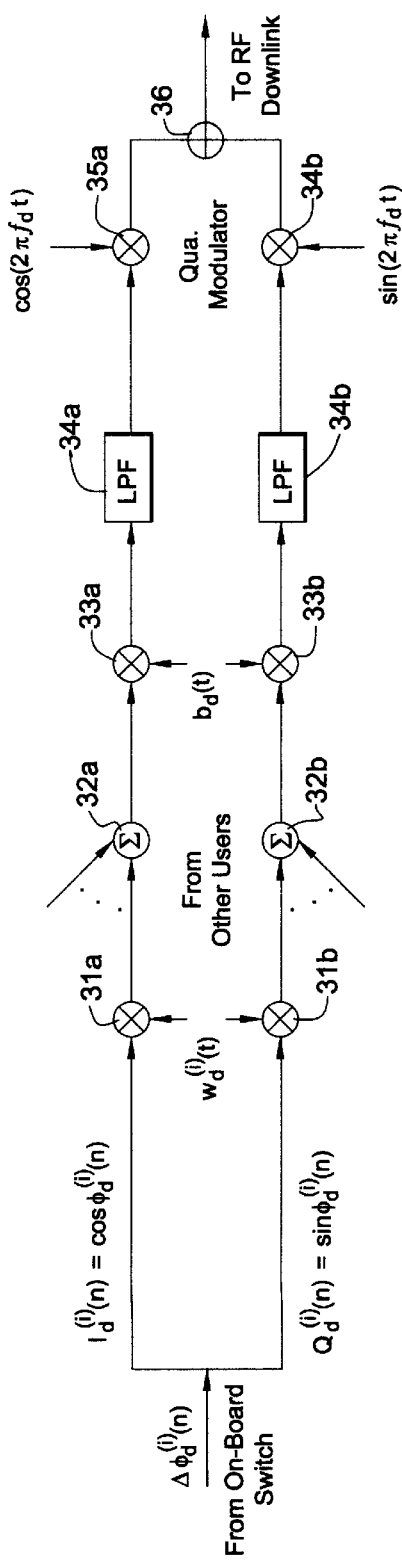
FIG. 3 is a block diagram showing the basic functional elements of a satellite-to-ground downlink transmitter according to the present invention.

After being appropriately switched, the differential phase symbols regenerated at the satellite receiver (assuming no channel decoding) are transmitted to ground destinations for decoding of sender information. FIG. 3 is a block diagram showing the basic functional elements of a satellite-to-ground downlink transmitter in a CDMA network according to the present invention. The two quadrature phase components of the switched differential phase symbols are chipped by the Walsh function $w_d^{(i)}(t)$ assigned to the user for the downlink at setup of the call at 31a and 31b. Similar signal components from other calls that are to be part of the downlink are summed together in a well-known manner at 32a and 32b. At 33a and 33b, the signals are spread using the PN sequence $b_d(t)$ for a downlink beam and filtered at 34a and 34b for shaping the baseband spectrum. The spread quadrature phase signals are respectively impressed on the quadrature components of an RF carrier having a desired carrier frequency for the downlink. The resulting RF signal is transmitted to the appropriate ground destination. While this processing can be done individually for each sender signal, the present invention permits that beam code spreading and quadrature modulation for downlink transmission may be performed collectively by combining all signals to be transmitted in the same downlink beam and using the same carrier.

Figure 4:
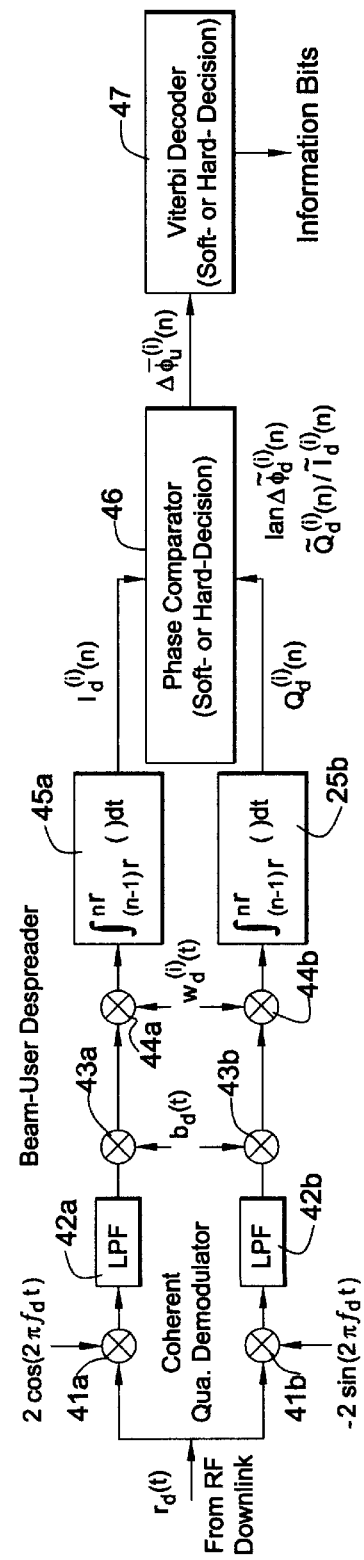
FIG. 4 is a block diagram showing the basic functional elements of a satellite-to-ground downlink receiver according to the present invention.

FIG. 4 is a block diagram showing the basic functional elements of a satellite-to-ground downlink receiver in a CDMA network according to the present invention. At the downlink receiver, the received RF signal is coherently quadrature down-converted to quadrature baseband signals, and then despread by the PN code sequence and the Walsh function used at the satellite transmitter for spreading, thereby extracting a desired user message signal from other user signals sharing the same CDMA channel. A phase comparator is used for calculating the carrier phase of the downlink RF signal for message detection, the downlink carrier phase being the uplink differential phase corrupted by noise and interference in both the uplink and the downlink.

In FIG. 4, after appropriate RF filtering and amplification, a received RF signal $r_d^{(i)}(t)$ is down-converted to baseband signals by coherent quadrature demodulation at 41a and 41b, and lowpass filtering at 42a and 42b. A message signal intended for a particular user is extracted from the demodulated quadrature phase components by first despreading in a well-known manner using the beam code sequence $b_d(t)$ for the user at 43a and 43b, and then despreading using the user Walsh function $w_d^{(i)}(t)$ at 44a and 44b and an integrate-and-dump process at 45a and 45b. The quadrature outputs from integrators 45a and 45b are then used for phase evaluation in a well-known manner at 46 for yielding the downlink carrier phase, which is the noise and interference corrupted uplink differential phase that carries the desired message information. When bit/symbol interleaving is used at the ground transmitter, a bit/symbol deinterleaver is used at the ground receiver in a well-known manner in accordance with the interleaver position. A channel decoder 47, such as a Viterbi decoder providing soft- or hard-decision, recovers the user message bits.

While the present invention has been described in connection with the illustrated embodiments, it will be appreciated and understood that modifications may be made without departing from the true spirit and scope of the invention.

What is claimed is:

1. A method for signaling in a CDMA-based satellite communications network, comprising the steps of:
    receiving an RF signal over an uplink, the RF signal containing a coded user message that has been differentially phase encoded, and spread using two code sequences associated with the uplink;
    non-coherently quadrature demodulating the RF signal into quadrature baseband components;
    despreading the quadrature baseband components using the two code sequences associated with the uplink;
    phase comparing consecutive blocks of the despread quadrature baseband components for regenerating the differential phase signal carrying the coded user message;
    switching the regenerated differential phase signal to a selected downlink transmitter;
    respreading the quadrature baseband components of the differential phase signal using two code sequences associated with a downlink; and
    impressing the respread quadrature baseband components of the differential phase signal onto quadrature components of a downlink carrier to form a downlink RF signal.

2. The method according to claim 1, further comprising the step of transmitting the downlink RF signal.

3. The method according to claim 1, wherein the RF signal received over the uplink is received at a satellite and the downlink RF signal is transmitted from a satellite transmitter.

4. The method according to claim 1, wherein the two code sequences associated with the uplink include a user Walsh function and a beam pseudo-random number sequence for the uplink; and
    wherein the two code sequences associated with the downlink include a user Walsh function and a beam pseudo-random number sequence for the downlink.

5. The method according to claim 1, further comprising the steps of:
    grouping coded user message bits into successive groups at an uplink transmitter;
    generating a differential phase for each message bit group by mapping each message bit group on to a predetermined PSK constellation;
    generating an absolute phase for each message bit group by adding the differential phase for a current message bit group to an absolute phase for a message bit group that is preceding the current message bit group;
    phase modulating an uplink carrier using the absolute phase signal to form an RF signal;
    spreading the RF signal using the two code sequences associated with the uplink; and
    transmitting the spread RF signal on the uplink.

6. The method according to claim 5, wherein the uplink RF signal is transmitted from a terrestrially-based transmitter and received at a satellite receiver.

7. The method according to claim 5, wherein the two code sequences associated with the uplink include a user Walsh function and a beam pseudo-random number sequence for the uplink.

8. The method according to claim 1, further comprising the steps of:
    receiving the downlink RF signal, the downlink RF signal containing the user message that has been regenerated, respread and impressed onto quadrature components of the downlink RF signal;
    coherently quadrature demodulating the downlink RF signal into quadrature baseband components;
    despreading the quadrature baseband components using the two code sequences associated with the downlink;
    evaluating a downlink carrier phase from the despread quadrature baseband components; and
    recovering the user message.

9. The method according to claim 8, wherein the downlink RF signal is transmitted from a satellite transmitter and received at a terrestrially-based receiver.

10. The method according to claim 8, wherein the two code sequences associated with the downlink include a user Walsh function and a beam pseudo-random number sequence for the downlink.

11. A method for signalling in a CDMA-based satellite network, comprising the steps of:
    grouping coded user message bits into successive groups at an uplink transmitter;
    generating a differential phase for each message bit group by mapping each message bit group on to a predetermined PSK constellation;
    generating an absolute phase for each message bit group by adding the differential phase for a current message bit group to an absolute phase for a message bit group preceding the current message bit group;
    phase modulating an uplink carrier using the current absolute phase to form an RF signal;
    spreading the RF signal using two code sequences associated with the uplink; and transmitting the spread RF signal on the uplink.

12. The method according to claim 11, wherein the uplink RF signal is transmitted from a terrestrially-based transmitter and received at a satellite receiver.

13. The method according to claim 11, wherein the two code sequences associated with the uplink include a user Walsh function and a beam pseudo-random number sequence for the uplink.

14. A method for signalling in a CDMA-based satellite network, comprising the steps of:
    receiving a phase shift keyed downlink RF signal, the downlink RF signal containing a user message that has been regenerated from a differentially phase shift keyed uplink RF signal, respread and impressed onto quadrature components of the downlink RF signal;
    coherently quadrature demodulating the downlink RF signal into quadrature baseband components;
    despreading the quadrature baseband components using two code sequences associated with the downlink;
    evaluating a downlink carrier phase from the despread quadrature baseband components; and
    recovering the user message.

15. The method according to claim 14, wherein the downlink RF signal is transmitted from a satellite transmitter and received at a terrestrially-based receiver.

16. The method according to claim 14, wherein the two code sequences associated with the downlink include a user Walsh function and a beam pseudo-random number sequence for the downlink.

17. A CDMA-based satellite communications system, comprising:
    an RF receiver for receiving an RF signal over an uplink, the RF signal containing a coded user message that has been differentially phase encoded, and spread using two code sequences associated with the uplink;
    a non-coherent quadrature demodulator for non-coherently quadrature demodulating the RF signal into quadrature baseband components;
    a spread-spectrum despreader for despreading the quadrature baseband components using the two code sequences associated with the uplink;
    a phase comparator for phase comparing consecutive blocks of the despread quadrature baseband components and regenerating the differential phase signal of the coded user message;
    a switch for switching the regenerated differential phase signal to a selected downlink transmitter;
    a spread-spectrum spreader for respreading the quadrature baseband components of the differential phase signal using two code sequences associated with a downlink; and
    a quadrature modulator for modulating a downlink carrier using the respread quadrature baseband components of the differential phase signal to form a downlink RF signal.

18. The CDMA-based satellite communications system according to claim 17, further comprising a satellite transmitter for transmitting the downlink RF signal to a terrestrially-based receiver.

19. The CDMA-based satellite communications system according to claim 17, wherein the CDMA-based communications system is a satellite transceiver.

20. The CDMA-based satellite communications system according to claim 17, further comprising:
    a PSK mapper for mapping coded user message bits into differential phases, the coded user message bits being grouped into blocks of message bits prior to being differentially phase mapped;
    a differential phase encoder for generating a current absolute phase for each block of message bits by adding the differential phase for a current block of message bits to an absolute phase for a block of message bits preceding the current block of message bits;
    a PSK modulator for phase modulating an uplink carrier using the current absolute phase to form an RF signal;
    a spread-spectrum spreader for spreading the RF signal using the two code sequences associated with the uplink; and
    a transmitter for transmitting the spread RF signal on the uplink.

21. The CDMA-based satellite communications system according to claim 20, wherein the RF signal for the uplink is transmitted by a terrestrially-based transmitter.

22. The CDMA-based satellite communications system according to claim 20, wherein the two code sequences associated with the uplink include a user Walsh function and a beam pseudo-random number sequence for the uplink, and
    wherein the two code sequences associated with the downlink include a user Walsh function and a beam pseudo-random number sequence for the downlink.

23. The CDMA-based satellite communications system according to claim 17, further comprising:
    a downlink receiver for receiving the downlink RF signal;
    a coherent quadrature demodulator for coherently quadrature demodulating the downlink RF signal into quadrature baseband components;
    a spread-spectrum despreader for despreading the quadrature baseband components using the two code sequences associated with the downlink;
    a phase comparator for evaluating a downlink carrier phase from the despread quadrature baseband components; and
    a channel decoder for detecting and decoding the coded user message.

24. The CDMA-based satellite communications system according to claim 23, wherein the downlink RF signal is received by a terrestrially-based receiver.

25. A CDMA-based satellite communications system, comprising:
    a PSK mapper for mapping coded user message bits into a differential phases, the coded user message bits being grouped into blocks of message bits prior to being differentially phase mapped;
    a differential phase encoder for generating a current absolute phase for each block of message bits by adding the differential phase for a current block of message bits to an absolute phase for a block of message bits preceding the current block of message bits;
    a PSK modulator for phase modulating an uplink carrier using the current absolute phase to form an RF signal;
    a spread-spectrum spreader for spreading the RF signal using two code sequences associated with the uplink; and
    a transmitter for transmitting the spread RF signal on the uplink.

26. The CDMA-based satellite communications system according to claim 25, wherein the RF signal for the uplink is transmitted by a terrestrially-based transmitter.

27. The CDMA-based satellite communications system according to claim 25, wherein the two code sequences associated with the uplink include a user Walsh function and a beam pseudo-random number sequence for the uplink.

28. A CDMA-based satellite communications system, comprising:
   a downlink receiver for receiving a downlink RF signal, the downlink signal being regenerated from a differentially phase shift keyed uplink RF signal;
   a coherent quadrature demodulator for coherently quadrature demodulating the downlink RF signal into quadrature baseband components;
   a spread-spectrum despreader for despreading the quadrature baseband components using two code sequence associated with the downlink;
   evaluating a downlink carrier phase from the despread quadrature baseband components; and
   recovering the user message.

29. The CDMA-based satellite communications system according to claim 28, wherein the downlink RF signal is received by a terrestrially-based receiver.

30. The CDMA-based satellite communications system according to claim 28, wherein the two code sequences associated with the downlink include a user Walsh function and a beam pseudo-random number sequence for the downlink.

31. A method for signaling in a CDMA-based satellite communications network, comprising steps of:
   receiving a differentially phase shift keyed RF uplink signal; and
   transmitting a phase shift keyed RF downlink signal, the phase shift keyed RF downlink signal being regenerated from the differentially phase shift keyed uplink RF signal.

32. A CDMA-based satellite communications system, comprising:
   an RF receiver receiving a differential phase shift keyed RF uplink signal; and
   a transmitter transmitting a phase shift keyed RF downlink signal, the phase shift keyed RF downlink signal being regenerated from the differentially phase shift keyed uplink RF signal.

* * * * *